United States Patent [19]

Hetrick

[11] Patent Number: 4,806,859
[45] Date of Patent: Feb. 21, 1989

[54] RESONANT VIBRATING STRUCTURES WITH DRIVING SENSING MEANS FOR NONCONTACTING POSITION AND PICK UP SENSING

[75] Inventor: Robert E. Hetrick, Dearborn Heights, Mich.

[73] Assignee: Ford Motor Company, Dearborn, Mich.

[21] Appl. No.: 7,033

[22] Filed: Jan. 27, 1987

[51] Int. Cl.$^4$ .................. G01B 7/14; G01R 33/02; H01L 41/08; H02N 2/00

[52] U.S. Cl. .................................. 324/207; 324/257; 310/330

[58] Field of Search ............... 324/207, 208, 257, 226, 324/262, 261, 260; 310/318, 328, 330

[56] References Cited

U.S. PATENT DOCUMENTS 2,517,975  8/1950  Chapin ............................. 324/257
2,914,975  11/1959  Heidenhein et al. ............. 324/208
4,006,408  2/1977  Sugisahi et al. .................. 324/208
4,297,872  11/1981  Ikeda et al. ........................ 73/32 A Primary Examiner—Reinhard J. Eisenzopf
Assistant Examiner—Walter E. Snow
Attorney, Agent, or Firm—Peter Abolins; Keith L. Zerschling

[57] ABSTRACT

A vibration type sensor can make a noncontacting measurement of position or pick up the passage of an object past a point. The sensor has a coil of wire placed on a vibrating structure. As an object with an attached magnet approaches the coil, an emf is induced in the coil indicating position. Alternatively, the magnet remains fixed with respect to the vibrating coil while a material of high magnetic permeability approaches the coil and magnet combination thereby perturbing the magnetic field and changing the induced emf. This method can be used to obtain a linear variation of sensor output with position or to enable the use of the device as a pickup sensor.

6 Claims, 3 Drawing Sheets

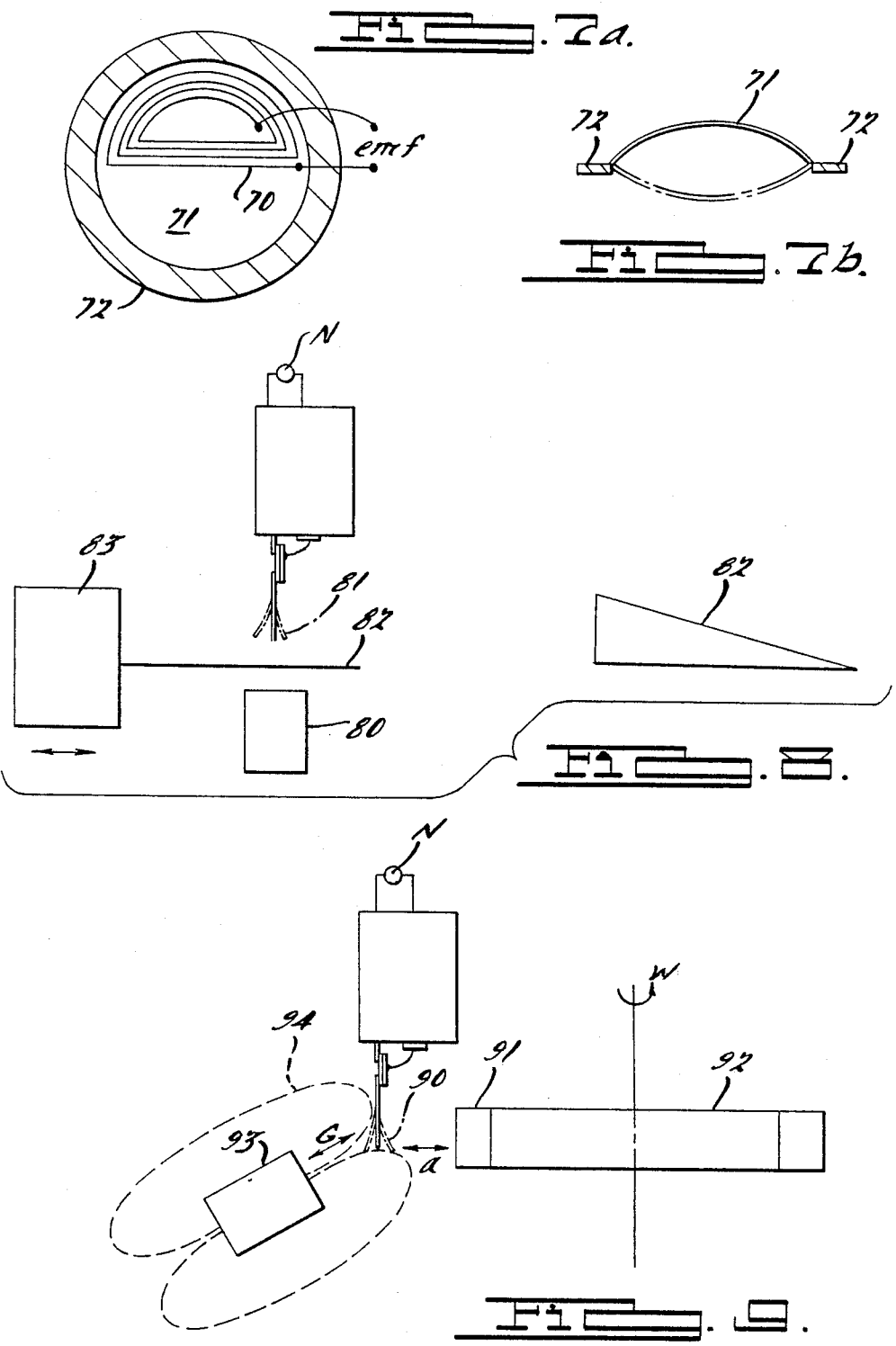

RESONANT VIBRATING STRUCTURES WITH DRIVING SENSING MEANS FOR NONCONTACTING POSITION AND PICK UP SENSING

BACKGROUND OF THE INVENTION

1. Field of the Invention

This invention relates to a non contacting measurement of the distance from an object to a reference point.

2. Prior Art

Many methods are known for determining the position or distance of an object from a reference point. Frequently, these same methods may be used to determine whether an object is present at a position (or a range of positions) or the temporal rate at which an object appears at a position (e.g., as for a rotating or oscillating object).

These methods may be divided into contacting and noncontacting types depending on whether the object, or an extension of the object, contacts the sensing element. A well known contacting method involves measuring a change in electrical resistance and is illustrated in FIG. 1. An extension 11 of an object 10 is an electrical conductor like a metal which slides on a second conductor 13 as the object moves. The change in contact position between the two conductors varies the length and, accordingly, the resistance, $R_v$, of that portion of conductor 13 appearing in an external circuit 14. Element 11 is joined to external circuit 14 by a flexible wire. The variation of resistance with object motion affects the electrical characteristics of external circuit 14 in a manner convenient for measurement, thus providing a sensing of the position of object 10. Although useful in some applications, the contact between element 11 and conductor 13 can be subject to wear, vibration (leading to electrical jitter) or chemical contamination depending on ambient conditions.

Of the numerous types of noncontacting position and/or pick-up sensors, many involve electromagnetic energy in the form of capacitive, magnetic (e.g., linear variable differential transformer, Hall effect) or optical methods. Acoustical methods (e.g., sonar, ultrasonic) are also widely used. Each of these methods has its particular area of applicability arising from consideration of cost, durability, operating environment, etc.

Also, methods using a resonantly vibrating element in combination with electromagnetic techniques are especially advantageous for use in the automotive environment. U.S. Pat. No. 4,297,872 to Ikeda et al describes a vibration type transducer having a vibrator (e.g., a hollow metal cylinder) and vibration exciters (e.g., piezoelectric elements) which with suitable electrical activation cause the vibrator to vibrate in one or more of its resonant modes. Vibration detection means are located on or near the vibrator to sense the motion and provide an electrical output. In operation, a material or object whose property is to be sensed is suitably placed in proximity to the vibrator so that it modifies the resonant vibrational frequencies. For example, a fluid whose pressure is to be sensed is introduced into the cylinder. The vibrator may be so designed that the change in resonant frequency attending the introduction of this fluid is proportional to the fluid pressure. Alternately, the temperature of the fluid may alter the resonance in a characteristic way. Different methods may be used so that the approach of an object (e.g., its position) causes this resonance frequency to change in a particular way.

Vibration detection means can be used in two ways. First, they serve as an input to feedback electronic circuitry whose output is applied to the vibration exciters to keep the vibration excited at its resonant frequencies even though those frequencies may be changing. Secondly, they serve as input to additional circuitry for processing the frequency information so that an electrical output related to the quantity to be sensed is produced. Such a device typifies one method of operating vibrational sensors in which the quantity of interest modifies the vibrators resonant frequency. One of the disadvantages of this approach is that sensitivity can be low because the frequency does not go to zero, but rather returns to some fiducial value, as the perturbation or change which causes the frequency variation is reduced to zero.

This disadvantage does not occur in the present case, and an embodiment of this invention has high sensitivity and dynamic range. In addition, the device is appropriate for low cost manufacture as well as the ambient conditions peculiar to the automotive environment.

SUMMARY OF THE INVENTION

The present invention combines the vibrational characteristics of vibrating structures such as cantilever blades with the principles of electromagnetic induction to achieve a noncontact position and/or pick-up sensor. The sensor includes a coil of wire which is attached to a vibrating cantilever blade. The attachment is such that one region of the coil vibrates with large amplitude near the unclamped extremity of the blade while another region of the coil is stationary or vibrates with a relatively small amplitude because it is attached near the clamped end of the blade. The coil is largely coplanar with the blade. The free end of the blade with attached coil can be caused to vibrate with significant amplitude if the clamped end is attached to a vibration driver such as a piezoelectric bimorph and driven with a voltage source at the resonant frequency of the cantilevered blade.

Position sensing is based on the principle of the alternating current generator. A magnet is attached to the object to be sensed. As the object moves, the magnet traverses a path which causes it to approach or recede from the vibrating end of the blade and attached coil. The magnetic field of the magnet intercepts the vibrating coil causing a periodic emf to be generated as given by Lenz's law. As the object and attached magnet move closer to (or further from) the coil, the magnetic field intensity intercepting the coil increases (or decreases) causing the emf to increase (or decrease). Thus, the magnitude of the induced emf and its dependence on the spatial position of the object depend on a number of design parameters. These include the shape and number of turns of the coil, the vibrational frequency of the coil, the strength of the magnet and the line of approach or retreat of the magnet with respect to the coil. In summary, the vibrating coil is responsive to a magnetic field. If a magnet moves and the magnetic field changes, the magnitude of the induced emf changes. An advantage of the vibrating coil is that an emf exists before, during and after a change or perturbation of the magnetic field. For a non-vibrating coil, an emf is observed only when the magnetic field changes and is proportional to the rate of change of the magnetic field strength.

In an alternate embodiment, this magnet is detached from the object and placed in a fixed position with respect to the vibrating coil so that an emf is induced. A strip of magnetic material of high permeability (e.g., iron, nickel) is attached to the object. The coil/magnet combination is positioned so that as the object moves the magnetic material intercepts the space between the coil and magnet. The magnetic material distorts the magnetic field within this space and prevents it from intercepting the coil thereby reducing the induced emf. By shaping and positioning the permeable material appropriately, the change in emf with the position of the object can be tailored to a desired dependence. For example, a wedge-shaped strip could lead to a desirable linear dependence of object position with emf. Additionally, by appropriate strip design other object motions (e.g., rotary) may be sensed with no modification of the coil/magnet combination.

A modification of the above concept allows the coil/magnet combination to be used as a pick-up sensor. A typical application of such a sensor is to detect (i.e., pick up) the passage of a tooth on a toothed wheel in a noncontacting manner. In many applications the toothed wheel is made of a magnetic material such as iron. The coil/magnet combination is rigidly fixed with respect to each other so that an emf is induced in the coil. The combination is placed close to the outer circumference of the wheel. As the tooth of the wheel passes the combination, the magnetic field is distorted so that more magnetic field lines pass through the tooth. By appropriate placement of the magnet and coil, the passage of the tooth can cause fewer field lines to intercept the coil thereby reducing the induced emf. This reduced emf can be detected and used to sense the passage of the tooth. Of special importance for this method, is the fact that the pick-up signal does not depend on the velocity of the tooth. Further, the coil/magnet combination can be arranged so that the tooth need not intercept the space between the combination. This factor simplifies practical design considerations.

This approach has a feature of special importance. Because the resonant frequency of the vibrating structure can be high (e.g., 5–10 kHz), only a few (10–20) turns may be needed for the coil. Such a coil may reasonably be fabricated with modern photolithographic techniques. If the cantilever blade is made from silicon the signal processing electronics can be integrated on the blade. Further, the economies of silicon batch processing can also be realized.

The method has two other ancillary advantages. First, the signal originates in a rather low impedance source (10-20 turns of coil) with the result that it has low sensitivity to electrical noise pick-up. Secondly, being a resonant structure, it is insensitive to mechanical vibrations except near the resonant frequencies. If the fundamental vibrational mode is higher than the typical noise spectrum of the ambient, then the output will be largely free of noise from this source.

BRIEF DESCRIPTION OF THE DRAWINGS

FIG. 7a illustrates another embodiment of the position sensor in which a coil of wire vibrates on a diaphragm.

FIG. 7b illustrates the lowest frequency resonance vibrational mode of the diaphragm of FIG. 7a appropriate for use as a position sensor.

FIG. 8 illustrates another embodiment of the position sensor for achieving a sensor output which is linear with position in which the magnet remains fixed and an appropriately shaped magnetic wedge is attached to the object.

FIG. 9 illustrates another embodiment in which a fixed magnet in combination with a vibrating coil act as a pick-up sensor such as for the passage, or time rate of change of passage of the teeth on a toothed wheel of magnetic material.

DETAILED DESCRIPTION OF THE INVENTION

Figure 1:
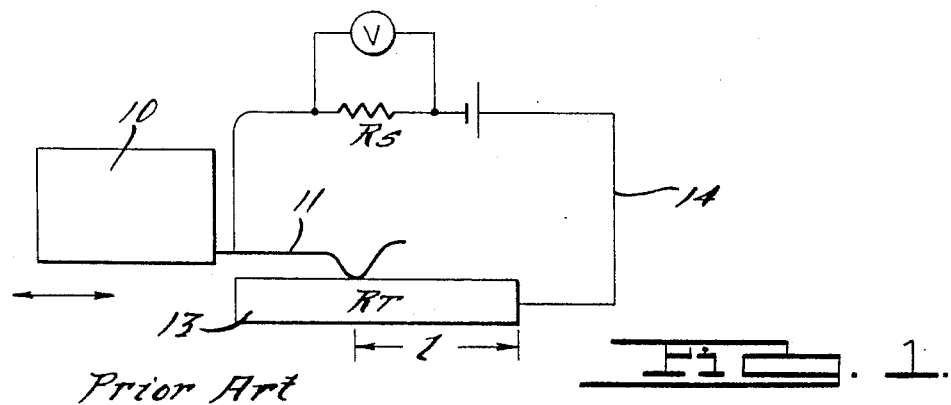
FIG. 1 is a schematic drawing illustrating a contacting position sensor which utilizes a change in electrical resistance to determine an object's position in accordance with the prior art.
Figure 2:
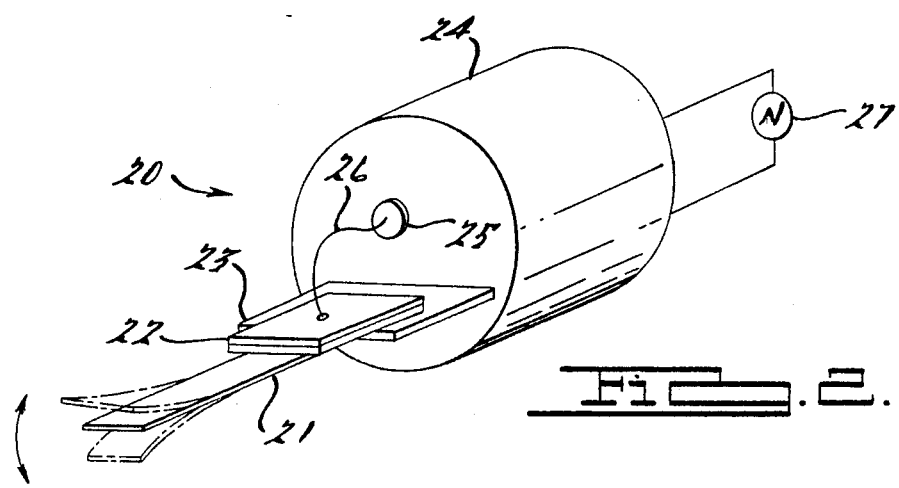
FIG. 2 shows a vibrating cantilever structure in which a vibrating blade, with an attached coil, is attached by a piezoelectric bimorph to a support structure containing electrical feedthroughs.

A noncontacting position sensor 20 employing a piezoelectrically driven vibrating cantilever is shown in FIG. 2. Sensor 20 includes a vibrating cantilever blade 21 onto which a coil (not shown in FIG. 2 for clarity) that is largely coplanar with blade 21 has been attached. The blade/coil combination is attached to the end of a ceramic piezoelectric bimorph 22 which in turn is attached in a cantilevered manner to an extension 23 of a support structure 24. Structure 24 contains two electrical feedthroughs for the purpose of applying an alternating emf to opposing faces of bimorph 22. One feedthrough 25 is shown with a lead wire 26 extending to the upper surface of bimorph 22. For convenience, the extension 23 to which the opposing face of bimorph 22 is attached can be an electrical conductor that serves as the other feedthrough. The frequency is adjusted to drive bimorph 22 and attached blade/coil combination in the fundamental vibrational mode of the cantilevered structure. That mode is one in which the free end of blade 21 has the maximum vibrational amplitude while the only mode is at the point of support of bimorph 22. For a single blade, the frequency of the fundamental vibrational mode is given by $$f = 0.16 \frac{h}{l^2} \left( \frac{E}{\zeta} \right)^{\frac{1}{2}}$$

wherein h is the thickness of a rectangular blade of length l from the free end to the point of constraint while E and $\zeta$ are the elastic modulus and density respectively. In the present case, the cantilever is actually a composite of the bimorph extending from its rigid support extension 23 and the attached blade/coil combination. As a result, the resonance frequency differ from that given above although the qualitative dependence of resonance frequency on material parameters (e.g., length, Young's modulus, etc.) is the same as indicated in the formula.

Figure 3:
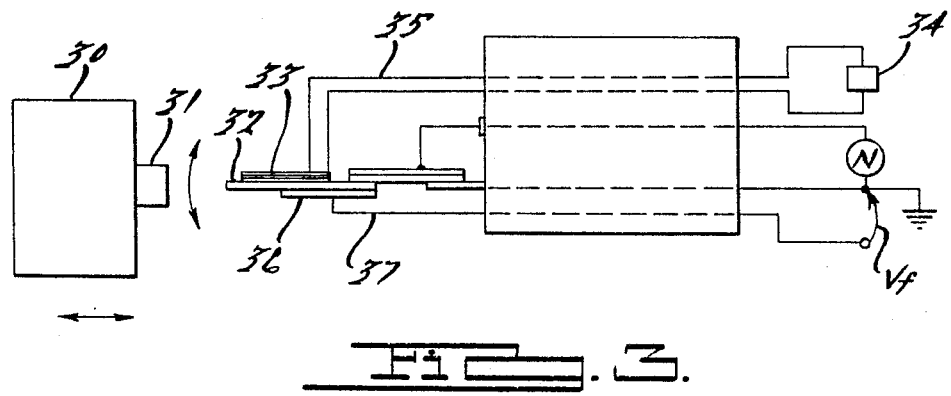
FIG. 3 shows a noncontacting position sensor adjacent an object to be sensed which has an attached magnet and is placed in a particular manner so that an emf is induced in a vibrating coil of wire attached to a cantilever blade.

FIG. 3 is a side view of the invention in use as a noncontacting position sensor. In this embodiment, an object 30, whose position is to be sensed, has an attached permanent magnet 31. The magnet is placed on the object so that as linear motion occurs, the magnet approaches or recedes from the tip of a blade 32/coil 33 combination. As for the alternating current generator, the magnetic field intercepts coil 33 attached to blade 32 and because of the motion of coil 33 causes an oscillating emf to be induced in the wires of coil 33. The magnitude of the emf is given by Lenz's law. As the object approaches (or recedes) from the coil, the strength of the magnetic field intercepting the coil increases (or decreases) causing the induced emf to increase (or decrease). The magnitude of the emf is detected by external circuitry 34 connected to the coil by two lead wires 35. This emf signal is a function of the motion of the object.

The dimensions, materials and other design parameters for the device are typically chosen for a specific application. As an example, the bimorph can be made of ceramic PZT (lead zirconate titanate) and have the approximate dimension $l_P=0.4$ cm, $\omega_P=0.15$ cm, $h_P=0.05$ cm. The blade can be made of cold-rolled steel of 1 mil thickness and have the dimension $l_G=0.4$ cm, $\omega_G=0.15$ cm. A largely rectangular coil of 15 turns is wrapped using 42 gauge insulated copper wire. The turns of the coil may be held together with plastic adhesive and attached using adhesives to the blade as shown in FIG. 3. For such a structure, the frequency of the first cantilever resonance mode is approximately 5 kHz. The Q of the resonance is on the order of 100. With approximately a 40 volt (peak-to-peak) electrical excitation of the bimorph, the displacement of the free end of the blade is on the order of 0.15 cm (peak-to-peak) at resonance.

Figure 4:
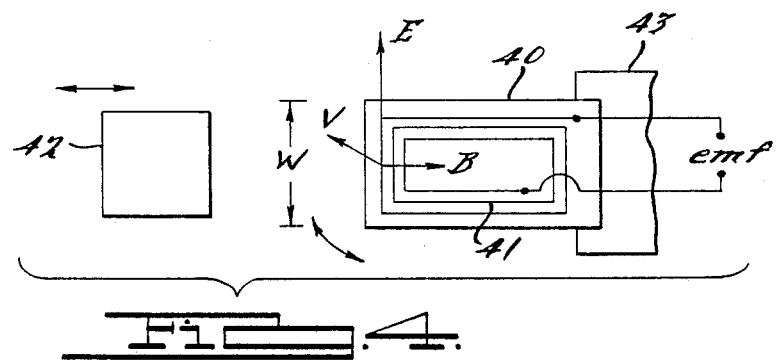
FIG. 4 shows a planar coil of wire on the cantilever blade as well as the induced electric field in the wire due to its velocity V in a magnetic field B of a magnet which is attached to an object whose position is to be sensed.

Referring to FIG. 4, the induced emf in an alternating current generator can be computed by integrating the expression $\overline{E}=\overline{v}\times\overline{B}$ around the coil. Here E is the electric field induced in an element of the coil which has velocity $\overline{v}$ in the presence of a magnetic field $\overline{B}$ from magnet 42. Considering the geometry of FIG. 4, assume B is along the length 1 of a blade 40, v is always perpendicular to length 1, and the segment of a coil 41 along the width w of blade 40 near a driver piezo 43 has essentially no motion so that v is approximately zero in this region. With this configuration the only contribution to the integral comes from that portion of coil 41 along the width at the unattached extremity of blade 40. Thus, the emf is approximately equal to $wnv_o B\sin\omega t$ which is approximately equal to $wnx_o\omega B\sin\omega t$ where n is the number of loops in the coil, $\omega$ the angular frequency of vibration and $v_o$ and $x_o$ are the maximum velocity and displacement of blade 40 at its extremity. Reasonable values are $l=5$ mm, $w=2$ mm, $x_o=0.2$ mm, $\omega=3\times10^4$ sec$^{-1}$, $n=10$, while B might vary in the range from 0.1 T to 0.01 T as the magnet and object travel over a distance of 2 cm. These parameters lead to an induced emf of 10 to 1 mV which with a calibrated device could be used to sense the object's motion by well known electrical techniques.

Although the above example assumes a coil of copper wire, other methods of coil formation are possible. In particular, photolithographic techniques could be coupled with the thermal evaporation of metals to form a thin film planar coil. If the vibrating blade were made of silicon, the coil and emf signal processing electronics could be fabricated monolithically on the same substrate with silicon batch processing techniques enabling low cost production.

Figure 5:
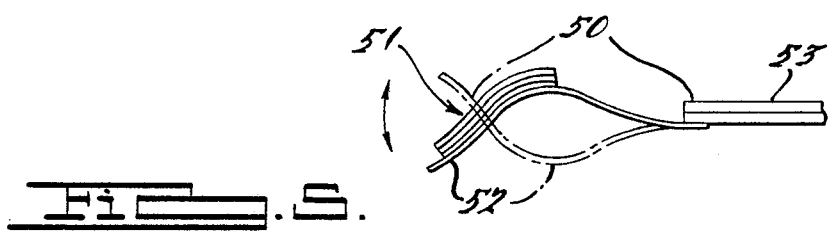
FIG. 5 illustrates the second resonance mode of a vibrating cantilever blade with an attached coil.

The use of the first vibrational resonance of a cantilever as the motional source for an induced emf is not unique. For example, one may exploit the second cantilever resonance illustrated in FIG. 5. Here there are two nodes (50) of the motion, one occurring near a piezoelectric drive 53. It would be appropriate for the segments of a coil 51 parallel to the width w to be placed at antinodes 52 of the motion. Because the velocities of these segments are approximately equal but opposite, their contributions to the emf integral are additive which leads to a doubling of the estimated emf with other factors being equal.

Figure 6A:
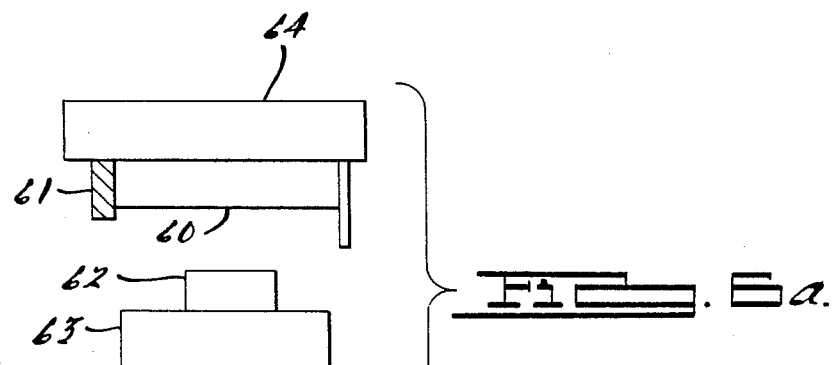
FIG. 6a illustrates another embodiment of the position sensor including a vibrating wire suspended between two posts (one of which is a piezoelectric bimorph) and positioned properly with respect to a magnet attached to the object whose position is to be sensed.
Figure 6B:
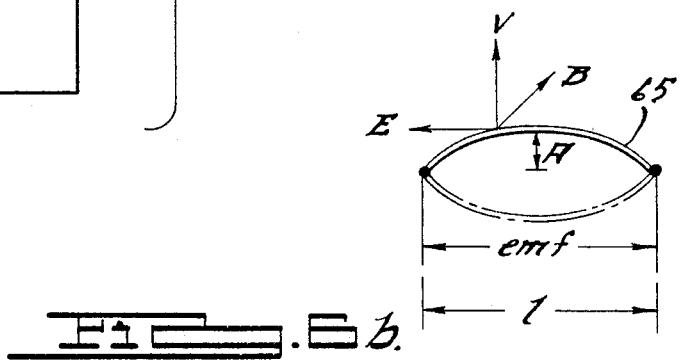
FIG. 6b illustrates the first resonance vibrational mode of the wire of FIG. 6a and the relevant parameters for computing the induced emf.

This approach is not limited to the vibration of cantilever blades as the source of coil velocity. Indeed, other vibrating structures could be advantageous from the viewpoint of manufacture or function. As an example, consider the single wire 60 attached to two posts extending from a support structure 64 as in FIG. 6a. A driver piezo 61 at the base of one post is driven by an oscillator at a frequency which corresponds to the first standing wave resonance mode 65 of the wire (see FIG. 6b). That frequency depends on physical parameters of the wire as well as the tension existing in the wire caused by its attachment. If a magnetic field originating from a magnet 62 attached to an object 63 is present in a direction perpendicular to the wire's displacement, an emf will be induced according to Lenz's law. A simple calculation shows that for a maximum vibrational amplitude A, which is much less than the length 1 of the wire, the induced $$emf = \frac{2lA}{\pi}\omega B\cos\omega t$$

and $\omega$, B, and t have the same meanings as in the cantilever example. Assume $l=5$ mm, $A=0.5$ mm, $B=0.1$ T, and since the wire is light and can vibrate at high frequencies $\omega=6\times10^4$ sec.$^{-1}$. This yields an emf approximately equal to 5 mV. Although small, the relatively high frequency and low source impedance of the signal would assist in its detection and processing. The size of the signal could be increased by increasing the number of wires. One way to do this would be to place wires 70 on a vibrating diaphragm 71 as shown in FIGS. 7a and 7b. In that way each wire could be connected near the base 72 of the diaphragm so that the emf's from each wire add. In the same way other vibrating structures particularly appropriate for other applications can be designed.

Whatever the structure of the vibrating wires, as the magnet attached to the object approaches them, the field strength may change nonlinearly necessitating additional signal processing. Linearity might be regained by shaping the magnet or using additional fixed magnets. An alternate approach, shown in FIG. 8, is to leave the magnet 80 in a fixed position relative to the vibrating element 81 while a high magnetic permeability material 82 attached to an object 83 intercepts the field. The shape of the permeable "shield" (such as a wedge) can be designed so that the motion of the object linearly changes the field strength at the position of the vibrating wires thereby realizing a linear sensor output with position. Linear response for different object motions such as rotary travel could be accommodated with different shapes for the shield.

In the use of resonant vibrational structures with a moderately large Q, small dimensional variations in manufacture or changes in material properties with temperature or pressure will cause the resonance frequency to change. If the structure is electrically driven somewhat off resonance, the vibrational amplitude, the velocity of the attached coil, and accordingly the magnitude of the sensor output will decrease rapidly as the deviation from the resonant frequency increases. Thus, to usefully implement these concepts, a convenient method is required to electrically sense the motion of the blade (both amplitude and frequency) and use this signal as the input to feedback electronic circuitry whose output in turn drives the ceramic bimorphs at the correct frequency and voltage to keep the blade always vibrating at resonance and at a constant amplitude under variable ambient conditions.

Feedback circuitry which accomplishes these two objectives would be reasonably straight forward to construct for those skilled in this art. The prior art, U.S. Pat. No. 4,297,872 discusses such techniques using phase locked loops. One method to acquire the feedback signal in this case is to place a small piece of thin polymeric piezoelectric material, 36 in FIG. 3, (e.g., a 9 micron thick layer of $PVF_2$ from Penwalt Corp.) on the blade which is electrically grounded. Using a thin wire 37 (e.g., 1 mil Au) contact can be made to the outer surface of this feedback piezo without greatly impeding vibration. During vibration, the stretching and contraction of the polymeric piezo produces an electrical output, $V_f$, which is proportional to vibrational amplitude. Using that signal as input, feedback electronic circuits can be built which effect the dual function of maintaining the vibration always at its resonant frequency (although this may be changing with conditions) and always at constant amplitude. In the case of a vibrating blade made of silicon, the polymeric piezos could be replaced by piëzoresistors fabricated directly in the blade. Strain in the blade which occurs during vibration causes the resistors to change their value proportionally. This change can be monitored electrically and used for feedback control.

An additional application of the vibrating coil-magnet assembly would be that of a "pick-up" sensor similar to that used for engine speed and crankshaft position in current automotive applications. The usage is illustrated in FIG. 9 where a vibrating coil 90 (as on a cantilever blade) magnet assembly is positioned close to teeth 91 (made of iron or other magnetic material) of a gear 92 whose rotational motion indicates speed for example. Thus, speed would be determined by the number of teeth passing a reference point per unit of time. Device operation depends on the appropriate placement of magnet 93 with respect to the coil. Dotted lines 94 coming from magnet 93 suggest the form of the magnetic B field. With the tooth at its furthest distance from the coil-magnet assembly, the magnet 93 is positioned so that a substantial oscillating emf is induced in coil 90. As the tooth approaches the assembly, it distorts the magnetic field in the vicinity of coil 90 so that a much smaller emf is induced. This reduction marks the passage of the tooth and the rate of tooth passage can be determined by external signal processing circuitry which uses the induced emf as input. The key to the device operation is to achieve a large emf variation. This in turn will depend on the relative sizes of magnet 93, coil 90, teeth 91, the distance of the teeth from the coil magnet assembly, and the magnetic properties of the material from which teeth 91 are made.

Using cantilever blades of the sizes assumed in prior calculation and small cylindrical magnets (e.g., samarium cobalt rare-earth magnets from Hitachi Magnetics Co.) of comparable dimensions, induced emf reductions by a factor of 5 at the closest approach of the teeth (made of iron) were observed for the geometry of FIG. 9 where the dimension a and b were on the order of 2–3 mm. One advantage of this technique is that the tooth need not come between coil and magnet thus allowing the same sensor unit to be used with different toothed wheels. Secondly, this method has the advantage that the pickup signal doesn't depend on the rotational velocity of the wheel as long as the angular frequency of wheel is less than the angular frequency of vibration of the coil. The linear proportionality of pick-up signal with rotational velocity is an important disadvantage of some other, nonvibrational, pick-up sensors.

Various modifications and variations will no doubt occur to those skilled in the art to which this invention pertains. For example, the particular shapes and sizes of the cantilevered components can be varied from those disclosed here. These and all other variations which basically rely on the teachings through which this disclosure has advanced the art are properly considered with the scope of this invention.

I claim:

1. A resonant vibrating structure including:
   driving means to electrically excite vibrations of said structure;
   an adjacent external magnet;
   wire coil means coupled to said vibrating structure and responsive to vibration of said vibrating structure, said wire coil means being positioned so that when the magnetic field from said external magnet is perturbed an electromagnetic force, emf, is induced in said wire coil means by electromagnetic induction;
   said wire coil means being appropriately sized and positioned with respect to said magnet so that the induced emf changes in a predetermined desired manner as the magnetic field is present so that the emf can serve as a sensor of relative position between an object perturbing the magnetic field and said wire coil means;
   electrical circuit means coupled to said wire coil means to detect the emf and to generate an output signal as a function of the emf;
   a sensing means for feedback control coupled to said vibrating structure means for generating an electrical signal in proportion to the vibration of said structure;
   feedback means coupled to said driving means and to said sensing means for feedback control, said feedback means providing an output which drives the driving means for exciting the vibration and keeping said resonant vibrating structure vibrating at its resonant frequency and at constant amplitude even though the resonant frequency may be changing with the external ambient conditions such as temperature;

a shield of high magnetic permeability attached to the object whose position is to be sensed, said shield of high magnetic permeability being appropriately shaped and placed so that as the object moves, said shield distorting the magnetic field near said wire coil means and causing the induced emf to vary in a desired manner, such as linearly, with the position of the object;

said vibrating wire coil means and said magnet being fixed and positioned with respect to each other so that the passage of an object of high magnetic permeability distorts the field at said wire coil means and varies the emf thereby sensing the passage of the object; and wherein said resonant vibrating structure includes:

a planar cantilever blade which vibrates in its first resonant cantilever mode;

said driving means coupled to said cantilever blade and electrically excited at a frequency to cause the blade to vibrate at its first resonant cantilever mode; and said wire coil means being attached to said blade in a largely coplanar fashion so that a portion of the coil exists at the base of the blade where there is reduced vibrational amplitude while another portion of said coil exists at the extremity where the amplitude has its maximum value.

2. A resonant vibrating structure as recited in claim 1, wherein said wire coil means is fabricated of fine wire having a plurality of turns held together with an adhesive.

3. A resonant vibrating structure as recited in claim 1, wherein said wire coil means is planar and formed by thermal evaporation or sputtering of metals in combination with photolithographic techniques.

4. A resonant vibrating structure as recited in claim 3, wherein said blade is made of silicon and said electronic circuit means is fabricated on said blade.

5. A resonant vibrating structure as recited in claim 4, wherein said sensing means for feedback control which provides a signal to said feedback means for maintaining resonance conditions is a thin layer of piezoelectric polymer attached in a coplanar fashion to said blade.

6. A resonant vibrating structure as recited in claim 5, wherein said sensing means for feedback control which provides a signal to said feedback means for maintaining resonance condition is a silicon piezoresistive element fabricated in said silicon blade itself and located so that vibration of said silicon blade strains said silicon piezoresistive element causing a change in its electrical resistance.

* * * * *